Jan. 28, 1958  J. J. CANEPA  2,821,153
FREIGHT BRACING DEVICE
Filed Oct. 14, 1953  2 Sheets-Sheet 2
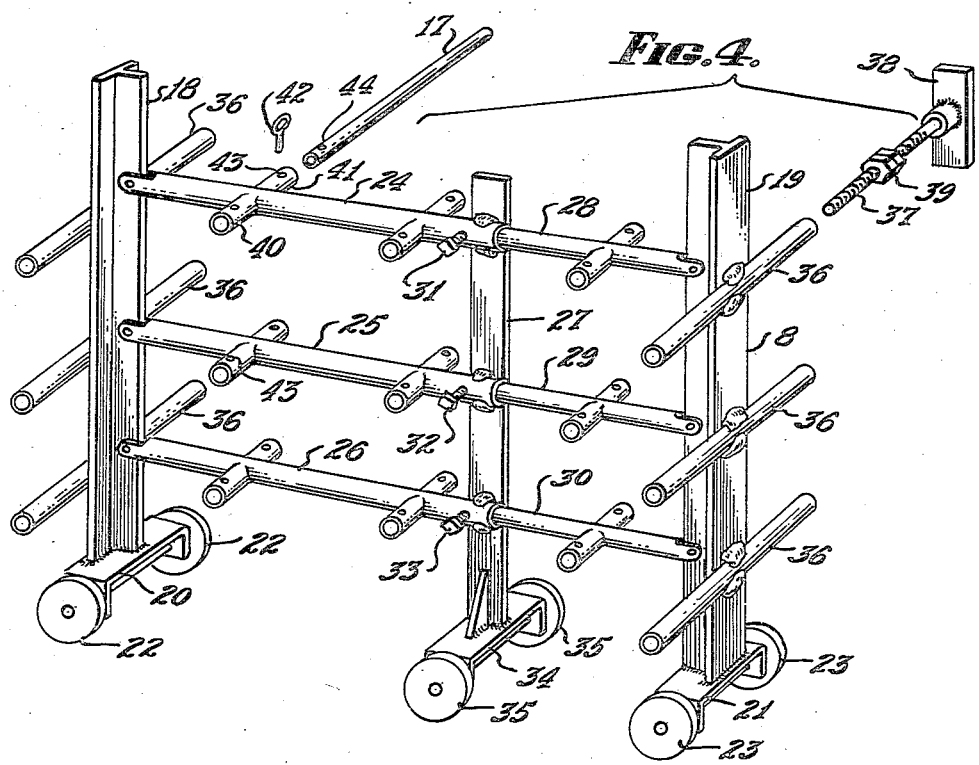
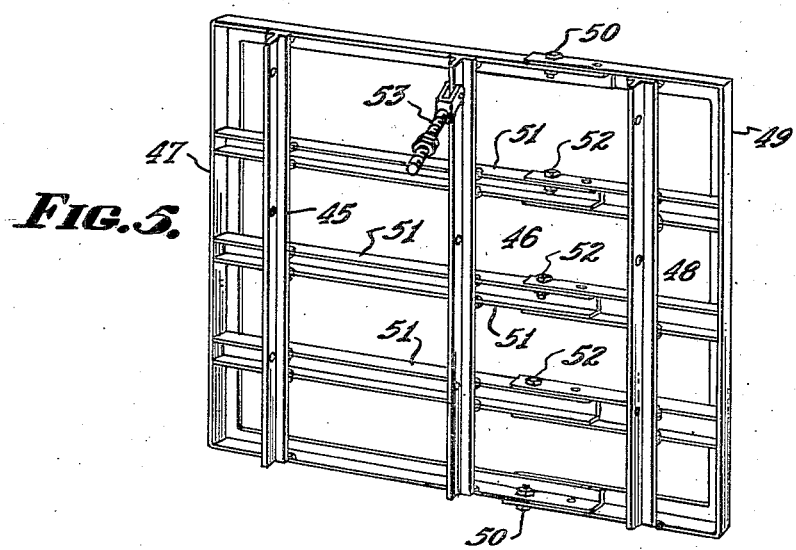
INVENTOR.
JOHN J. CANEPA,
BY
*Allen & Allen*
ATTORNEYS.

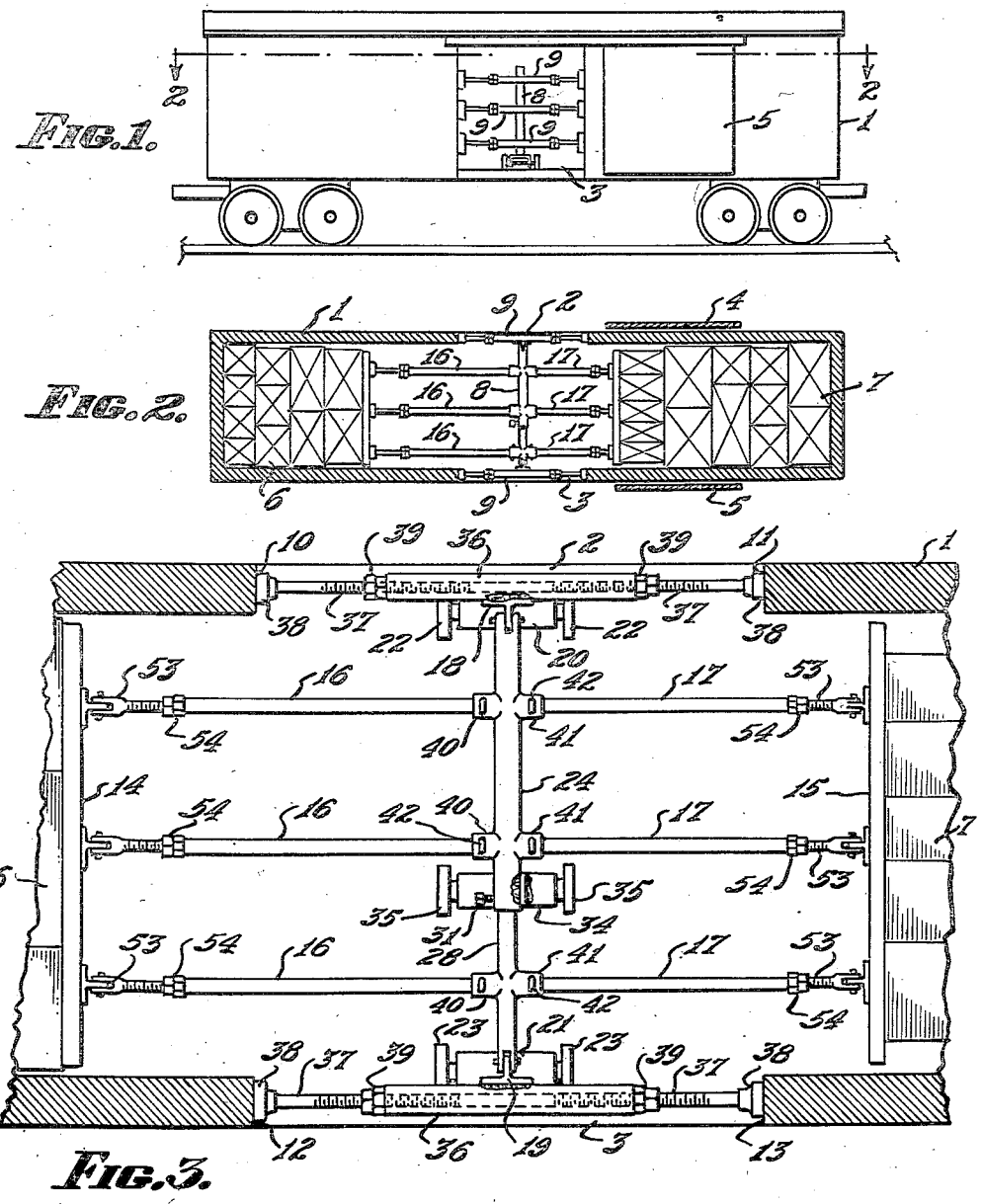

United States Patent Office 2,821,153
Patented Jan. 28, 1958

2,821,153

FREIGHT BRACING DEVICE

John J. Canepa, Cincinnati, Ohio, assignor to General Freight Appliance Corporation, Cincinnati, Ohio, a corporation of Ohio Application October 14, 1953, Serial No. 385,911

2 Claims. (Cl. 105—369)

My invention relates to a freight bracing device for use in freight cars whereby boxes, crates, cases and other freight may be held securely in one or both ends of the car and prevented from sliding or becoming displaced in transit.

It is the usual practice in loading box cars to fill the two ends of the cars, working toward the center of the cars where a space is left adjacent the side doors thereof. Temporary wooden posts, braces and the like are generally nailed together between the freight to secure it in place; but the unsubstantial nature of the wooden braces and the haphazard manner in which they are often constructed, frequently result in the complete destruction of the bracing means, and as a consequence the freight is shifted and knocked about in the box car, arriving at its destination in a damaged and sometimes completely unusable condition.

Heretofore numerous suggestions have been made as to various mechanical means for bracing the freight load in a box car to prevent it from shifting and sliding during transit. Many of the prior art devices were designed to form a permanent installation in the box car and hence of no value to the railroad during such times as the car was traveling empty or carrying freight which did not require bracing. In many instances, the bracing devices did nothing more than brace the load at one end of the car against the load at the opposite end, with the result that, should the car be subjected to a sudden impact, one load would tend to crush the other.

It is a principal object of my invention to provide a freight bracing device which eliminates the difficulties enumerated above by providing a portable device capable of ready installation in any standard box car without the provision of special fittings or the like in the car. It is a further object of my invention to provide a freight bracing device which is adjustable longitudinally of the car to accommodate freight loads of varying size, as where the car is only partially filled; and wherein the freight load at each end of the car is braced against an intermediate support rather than against the freight at the opposite end of the car.

It is a still further object of my invention to provide a freight bracing device of the character described wherein the freight load at each end of the car is braced from a transversely disposed supporting structure rigidly secured between the opposed side doors of the car by means of bracing members extending between the sides of the door frames.

It is yet another object of my invention to provide a freight bracing device of the character described which is adjustable to accommodate freight loads of various sizes, and which is simple in construction, inexpensive to manufacture and easy to install and remove from the freight car.

These and other objects of my invention which will appear hereinafter or which will be apparent to the skilled worker in the art upon reading these specifications, I accomplish by that construction and arrangement of parts of which I shall now describe an exemplary embodiment.

Reference is now made to the accompanying drawings wherein:

Figure 1 is a side elevational view of a freight car showing the bracing device installed in the car.

Figure 2 is a plan sectional view taken along the line 2—2 of Figure 1.

Figure 3 is an enlarged partial plan sectional view of the device as illustrated in Figure 2.

Figure 4 is a perspective view with parts exploded of the transversely disposed supporting structure.

Figure 5 is a perspective view illustrating one of the bracing frames.

Referring now to Figures 1 and 2 of the drawings, I have therein illustrated a conventional box car 1 having opposed side door openings 2 and 3 closed by sliding doors 4 and 5, respectively, as is conventional in box car constructions. The box car is adapted to receive the freight loads 6 and 7 at the opposite ends thereof; and it will be understood that the freight loads will be packed inwardly from the opposite ends of the car. In the embodiment illustrated, the freight load occupies less than the full capacity of the car, the load 6 being smaller than the load 7. It will be understood, however, that the loads may vary widely; and the particular arrangement illustrated is solely for the purpose of illustrating the operation of my device.

Essentially, my device comprises a centrally disposed transversely extending supporting structure 8 which is fixedly secured between the door openings 2 and 3 by means of bracing members 9 which are adapted to be wedged between opposed sides 10, 11 and 12, 13 of the door openings 2 and 3, respectively. The freight load is supported by means of bracing frames 14 and 15 which are pressed against the freight loads by means of longitudinally extending bracing rods 16 and 17 extending between the supporting structure 8 and the bracing frames 14 and 15. The bracing rods 16 and 17 are axially adjustable so that the bracing frames may be firmly clamped against the freight loads 6 and 7.

As most clearly seen in Figure 4 of the drawings, the centrally disposed supporting structure 8 comprises vertically extending posts 18 and 19 which are preferably of T-shape, supported at their lower ends on brackets 20 and 21 which mount spaced apart pairs of wheels 22 and 23, respectively. The posts 18 and 19 are preferably welded or otherwise fixedly secured to the brackets. Transversely extending tubular rods 24, 25 and 26 are attached to the post 18, being spaced therealong in the manner illustrated; and these rods are supported at their opposite ends by supporting post 27 to which they are welded or otherwise fixedly secured. The post 19 is provided with mating rods 28, 29 and 30 which are adapted to be telescopically received in the free ends of the tubular rods 24, 25 and 26, respectively, the said mating rods being adjustably secured in the tubular rods by means of adjustment bolts 31, 32 and 33. The supporting post 27 will preferably be provided with a bracket 34 supporting a pair of spaced apart wheels 35. By means of this arrangement, the supporting structure may be readily moved from one place to another and easily installed in the box car.

The bracing members 9, by means of which the supporting structure is secured between the door openings in the box car, are each made up of a horizontally disposed tubular member 36 secured to the supporting post 18 or 19 and adapted to receive the threaded rods 37 having feet 38 on their outer ends. The rods 37 are provided with lock nuts 39 which serve to fix the threaded rods 37 in the ends of the tubular members 36.

As best seen in Figure 3, the supporting structure is arranged in the car with the tubular members 36 aligned with the side door openings 2 and 3, and the threaded rods 37 are fitted in the ends of the tubular members 36 with the feet 38 in contact with the opposed sides 10—13 of the door openings. The lock nuts 39 are then tightened against the ends of the tubular members 36 so as to wedge the bracing members between the sides of the door openings, thereby fixedly securing the supporting structure between the door openings. The feet 38 are preferably elongated as illustrated and may be provided with a suitable gripping surface for making gripping contact with the sides of the door openings.

The transversely extending rods 24, 25 and 26, and their mating rods 28, 29 and 30, are provided with oppositely directed pairs of sockets 40 and 41 adapted to receive the ends of the bracing rods 16 and 17. The bracing rods 16 and 17 may be conveniently secured in the sockets by means of pins 42 adapted to pass thorugh mating openings 43 and 44 in the sockets and bracing members, respectively.

The bracing frames 14 and 15, as best seen in Figure 5, are preferably of rectangular configuration and include vertical frame members 45 and 46 secured to the frame section 47, and vertical frame member 48 secured to the frame section 49. The frame sections 47 and 49 may be made adjustable relative to each other, as by means of bolts 50. Similarly, horizontal frame members 51 are made adjustable, as by means of adjustment bolts 52. Preferably the vertical frame members 45 and 46 will be arranged to be in substantial alignment with the sockets 40 and 41, and the vertical frame member 49 may be adjusted by adjusting section 48 to bring it into alignment with the sockets carried by the adjustable mating rods 28, 29 and 30.

The bracing rods 16 and 17 are connected to the bracing frames 14 and 15 by means of the threaded connecting rods 53 secured to the vertical frame members 45, 46 and 49 in substantial alignment with the sockets 40 and 41. The free ends of the connecting rods 53 are adapted to be received in the ends of the tubular rods 16 and 17, and the threaded connecting rods are provided with lock nuts 54 by means of which the frames are tightened against the freight.

It will be understood that the bracing rods 16 and 17 may be supplied in various lengths to accommodate different freight loads, or they may be provided in the form of telescoping members which may be adjusted to meet the needs of the particular load.

Modifications may, of course, be made in my invention without departing from the spirit of it. For example, while I have illustrated a preferred embodiment of my invention embodying three sets of three bracing rods, with three sets of bracing members in each side door opening, it will be evident that the number and arrangement of bracing rods and door bracing members may be varied without departing from the spirit of my invention. Similarly, other forms of adjustment means may be utilized.

Having, however, described my invention in an exemplary embodiment, what I desire to secure and protect by Letters Patent is:

1. A portable freight bracing device for use in a boxcar having opposed side door openings, said device comprising a vertically disposed supporting structure extending transversely of the car between the side door openings thereof, oppositely directed horizontally disposed bracing members extending outwardly from the ends of the supporting structure toward the sides of the door openings, door frame engaging feet on the outer ends of said bracing members, adjustment means for effectively increasing the lengths of the bracing members to press said feet into frictional engagement against the sides of the door frames and thereby rigidly secure the supporting structure crosswise of the car, oppositely directed adjustable freight bracing members secured at one end to said supporting structure and projecting lengthwise of the car, and means on the free ends of said freight bracing members for contacting the freight to be braced thereby, said freight bracing members being axially adjustable to force said freight contacting means against the freight, whereby the freight is effectively clamped between the ends of the boxcar and said freight contacting means.

2. A portable freight bracing device for use in boxcars having opposed side door openings, said device comprising a vertically disposed supporting structure extending transversely of the car between the side door openings thereof, oppositely directed horizontally disposed bracing members extending outwardly from the ends of the supporting structure toward the sides of the door openings, frictional engaging means on the free ends of said bracing members, means for forcing said frictional engaging means into tight frictional engagement with the opposite sides of the door frames to rigidly secure the supporting structure crosswise of the car, and freight bracing means anchored to said supporting structure for bracing freight between the ends of the car and said supporting structure.

References Cited in the file of this patent

UNITED STATES PATENTS

| | | |
|---|---|---|
| 763,844 | Benson | June 28, 1904 |
| 1,517,100 | Bacon | Nov. 25, 1924 |
| 1,753,400 | Bryson | Apr. 8, 1930 |
| 1,819,978 | Shur | Aug. 18, 1931 |
| 1,825,992 | Chandler | Oct. 6, 1931 |
| 1,836,126 | Luce | Dec. 15, 1931 |
| 1,909,178 | Hudson | May 16, 1933 |
| 2,038,692 | Thomas | Apr. 28, 1936 |
| 2,086,283 | Pierce | July 6, 1937 |
| 2,086,706 | Evans | July 13, 1937 |
| 2,091,869 | McCurdy | Aug. 31, 1937 |
| 2,160,079 | Nampa | May 30, 1939 |
| 2,177,525 | Henderson | Oct. 24, 1939 |
| 2,287,852 | Zyara | June 30, 1942 |
| 2,530,444 | Woods | Nov. 21, 1950 |
| 2,575,751 | Donnelley | Nov. 20, 1951 |